United States Patent Office 2,710,842
Patented June 14, 1955

2,710,842

HYDRAULIC TRANSMISSION FLUID

Theodore C. Heisig, White Plains, N. Y., and Robert L. Murphey, Port Arthur, Tex., assignors to The Texas Company, New York, N. Y., a corporation of Delaware No Drawing. Application May 19, 1950,
Serial No. 163,096

8 Claims. (Cl. 252—75)

This invention relates to a compounded mineral lubricating oil and more particularly to a hydraulic transmission fluid adapted for use in the automatic transmissions of motor vehicles.

One of the principal objects of the invention is to provide a hydraulic transmission fluid of this type which meets the rigorous requirements for this service, including high viscosity index, low pour point, oxidation and corrosion resistance, extreme pressure and oiliness characteristics to avoid noise or "squawk" in the automatic shift, and stability over a wide operating temperature range, while at the same time permitting the use of a refined mineral lubricating oil as the predominant constituent of the composition.

Other objects and advantages of the invention will be apparent from the following description and the appended claims.

In automatic transmissions employing fluid drive or a torque converter, the hydraulic fluid performs the functions of a power transmission medium, a heat transfer medium and a lubricant for bearing surfaces. The fluid may also be used as a hydraulic control fluid and a gear lubricant.

Rigorous requirements have been set up to qualify a hydraulic fluid for this service. These requirements include a viscosity index (ASTM) of at least 150 to provide improved operation over a wider temperature range and to insure that a single fluid can be used in all current production automatic transmission; a flash point of 365° F. minimum and a fire point of 395° F. minimum in order to minimize fire hazards in operation and reduce the tendency toward cavitation caused by vaporization in the hydraulic power transmission section; and a pour point of −35° F. maximum to insure pumpability of the fluid at low atmospheric temperatures. In addition, the fluid must not have a detrimental effect on copper alloys as determined by its ability to pass a copper strip corrosion test, must be able to withstand prolonged heating at high temperatures without decomposition, must have no deleterious effect on the synthetic seals used in automatic transmissions, and must have a high degree of oxidation resistance. Finally, the fluid must possess excellent anti-frictional properties involving oiliness and extreme pressure characteristics as determined by its ability to function in the automatic transmission without chatter or "squawking," which latter is a high pitched sound produced by a "stick-slip" phenomena of the clutch plates particularly in the second-third upshift.

In order to meet the unusual requirements with respect to high viscosity index, flash and fire points, and low pour point while still permitting the use of a refined mineral lubricating oil as the predominant or essential ingredient constituting at least 85% by weight of the fluid, and thereby avoiding the use of the more expensive synthetic lubricating bases for this purpose, it has been found that only certain types of mineral lubricating oil can be employed, and also only certain types and amounts of additives can be added to the oil and still satisfy the other requirements of the hydraulic transmission fluid. It has also been found that a great variety of inhibitors, which are usually efficacious in preventing oil oxidation and corrosion in motor oil service, actually increase the amount of sludge formed and the amount of deposits on the clutch plates of the transmission in this different type of service. The problem therefore was not that of selection of known additives for their expected results, but involved entirely new requirements in a non-analogous field.

In accordance with the present invention, a hydraulic transmission fluid which satisfactorily meets the above-noted rigorous requirements has been produced by a combination of certain additives in a particular type of refined paraffin base distillate mineral lubricating oil. Contrary to expectations, a paraffin base lubricating oil conventionally solvent dewaxed to a pour point of about 5° F. to −10° F. has been found unsuitable for the purpose of meeting the required high viscosity index coupled with the low pour point. Rather, the object of the present invention has been attained by selecting a comparatively light paraffin base distillate mineral lubricating oil having a viscosity index below 100 and above 65, and containing sufficient residual wax to have a pour point of at least 10° F. but below 30° F. To this oil is added a mixture of methacrylate ester co-polymers, including a methacrylate ester co-polymer having a predominant effect on reducing the pour point of a mineral lubricating oil, and another methacrylate ester co-polymer having a predominant effect on increasing the viscosity and viscosity index of a distillate mineral lubricating oil. In addition, there is added to the foregoing composition of sulfurized fatty material selected from the group consisting of fatty oils and fatty acid esters of monohydric alcohols, and containing from about 5 to 15% by weight, based on the fatty material, of stably combined sulfur and possessing extreme pressure and oiliness properties; an anti-oxidant and anti-corrosive polyvalent metal salt of a $P_2S_5$-aliphatic alcohol reaction product, wherein the aliphatic alcohol contains from 5 to 20 carbon atoms; and a small proportion of a petroleum sulfonate. This particular combination of additives, in conjunction with the particular type of paraffin base distillate mineral lubricating oil, with the additives employed in certain proportions as hereinafter specified, provides a satisfactory hydraulic transmission fluid meeting the rigorous requirements for automatic transmission service.

The paraffin base distillate mineral lubricating oil may be prepared from a treated pressed distillate by stilling, light to moderate acid treating, neutralizing, steaming and brightening. The base oil may also be prepared from a wax distillate by solvent refining and solvent dewaxing, followed by stilling and finishing. In either case, the base oil contains sufficient residual wax to have a pour point between 10° and 30° F., generally about 20° F., and a viscosity index of between about 70 and 95, generally around 75–85. For the purpose of meeting the requirement of a hydraulic fluid for a passenger car automatic transmission of an SUS viscosity at 210° F. of about 54–56, a comparatively light distillate oil of this character having an SUS viscosity at 100° F. of around 80–90 is selected, said oil generally having a flash point of about 350–375° F. Such a base oil may be conveniently prepared from a blend of conventional cuts, such as a blend of roughly equal proportions of a distillate oil of this character having an SUS viscosity at 100° F. of about 100 with a second distillate oil of this character having an SUS viscosity at 100° F. of about 70. As pointed out above, the resulting distillate paraffin base lubricating oil, or blend of oils, constitutes at least 85% by weight of the hydraulic fluid composition, generally about 88–96% thereof.

The methacrylate ester co-polymers employed have the formula

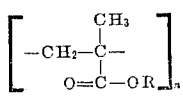

where R is a mixture of alkyl groups containing from 4 to 20 carbon atoms and $n$ is a number providing a molecular weight of the co-polymer of about 10,000 to 20,000. An important feature of the present invention involves the use, in combination, of two different methacrylate co-polymers of this general type, one predominating in pour depressant property and the other predominating in viscosity and viscosity index increasing properties. The pour depressant material is a co-polymer of about 30–70% by weight of $C_{15}$ to $C_{20}$ alkyl methacrylate esters with about 70–30% of lower alkyl methacrylate esters varying from $C_4$ to $C_{14}$. A very satisfactory material of this type is a co-polymer wherein R of the above formula is predominantly a mixture of cetyl, lauryl and octyl groups in the proportion of about 30–70% of cetyl, 45–10% of lauryl and 45–10% of octyl. The viscosity and viscosity index increasing material on the other hand is a copolymer of the lower $C_4$ to $C_{14}$ alkyl methacrylate esters. A very satisfactory material of this latter type is a co-polymer wherein R of the above formula is predominantly a mixture of lauryl and octyl groups in the proportion of about 40–60% of the former to 60–40% of the latter. Both co-polymers have molecular weights within the range of 10,000 to 20,000, and are readily soluble in a mineral lubricating oil.

A commercial methacrylate ester co-polymer of this type which is predominantly a pour depressant for mineral lubricating oils, is sold under the trade name of "Acryloid 150" by Rohm and Haas, wherein R is predominantly a mixture of cetyl, lauryl and octyl groups, and the molecular weight of the polymer is about 10,000 to 15,000. Another commercial methacrylate co-polymer of this type which is primarily a viscosity index improver is sold under the trade name of "Acryloid 710" by Rohm and Haas, wherein R is predominantly a mixture of lauryl and octyl groups, and the molecular weight is about 10,000 to 20,000. Each of these commercial methacrylate co-polymers is sold in the form of about a 40% concentrate of the active polymer in a light colored mineral lubricating oil base, providing a clear amber-colored viscous liquid having a kinematic viscosity at 210° F. of about 600 to 850 centistokes. In the following description, the co-polymer will be listed on an oil-free basis, except where the trade names of the commercial products are specified.

While the foregoing commercial "Acryloids" employed in combination constitute satisfactory additives for purposes of the present invention, it is to be understood that other methacrylate ester co-polymer mixtures, including a co-polymer wherein R of the above formula includes a substantial proportion of higher molecular weight $C_{15}$ to $C_{20}$ alkyl groups in admixture with the lower molecular weight $C_4$ to $C_{14}$ alkyl groups to predominate in pour point depressant properties, along with an additional methacrylate ester co-polymer wherein R is a mixture of the lower molecular weight $C_4$ to $C_{14}$ alkyl groups to predominate in viscosity index improving properties, can be employed. In any case, it has been found that, in the use of the base oil containing residual wax and having a pour point of 10° F. to 30° F., substantial proportions of both types of methacrylate ester co-polymers approaching substantially equal proportions are essential in providing the required 150 minimum viscosity index together with the —35° F. maximum pour point of the present hydraulic fluid. Thus proportions of about 40–65% by weight of the pour depressant co-polymer to 60–35% of the viscosity index improving co-polymer, the proportions being based on the weight of the mixture of co-polymers, are generally employed. Depending on the particular base oil stock and other additive ingredients employed a proportion of about 1–6% by weight of the mixture of methacrylate ester co-polymers on the basis of the hydraulic fluid is required, with proportions of about 2.5–3.5% by weight being preferred.

The required frictional properties of the fluid involving extreme pressure and oiliness characteristics, in the presence of the other ingredients, are afforded by the addition of about 1–5%, and preferably about 2–4%, by weight of a sulfurized fatty oil, or a sulfurized fatty acid ester of a monohydric alcohol. For this purpose, sulfurized sperm oil is preferred. However, other sulfurized fatty oils, such as rape seed oil, cotton seed oil and palm oil, and other sulfurized fatty acid esters of monohydric alcohols, such as cetyl palmitate, butyl oleate, amyl ricinoleate and ethyl oleate, can be employed. These sulfurized fatty materials are characterized by having about 5–15% by weight, based on the fatty material, of stably combined sulfur, such that the hydraulic fluid passes the copper corrosion test while still providing the improved frictional properties.

While many of the known anti-oxidants and anti-corrosives for motor oil service are ineffective or unsatisfactory in the present hydraulic transmission fluid, it has been found that the addition of about 0.1–2.0%, and preferably about 0.3–1.2%, by weight based on the fluid, of a polyvalent metal salt of a $P_2S_5$-aliphatic alcohol reaction product, wherein the aliphatic alcohol contains from 5 to 20 carbon atoms, constitutes a highly effective anti-oxidant and anti-corrosive in the presence of other additive ingredients for purposes of the present invention. These $P_2S_5$-aliphatic alcohol reaction products are dialkyl dithiophosphoric acids, and the metal salts are dialkyl dithiophosphates. While various polyvalent metals, including zinc, magnesium, lead, aluminum, calcium and barium can be employed to form the metal salt, the alkaline earth metals are preferred. A highly effective material of this character is barium dialkyl dithiophosphate of the formula

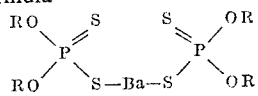

where R is $C_{10}$–$C_{12}$.

In addition, about 0.05–1.0%, and preferably about 0.1–0.4% by weight, of an oil-soluble petroleum sulfonate is included in the composition to stabilize the same against sedimentation and to generally improve the stability of the hydraulic fluid over the wide temperature range. Any oil soluble metal salt of a petroleum sulfonic acid is suitable for this purpose, although sodium mahogany sulfonate is preferred.

In addition, the composition preferably includes a suitable anti-foam agent, since hydraulic fluids are circulated rapidly in operation and air may be entrapped. For this purpose, a silicone polymer of high viscosity, such as a dimethyl silicone polymer having a kinematic viscosity at 25° C., of about 1,000 centistokes and above, is preferably employed, since this agent also desirably increases the flash point of the fluid. The use of a high viscosity silicone polymer in a hydraulic fluid of the mineral lubricating oil type to inhibit foaming and increase the flash point is disclosed and claimed in the copending application of Charles C. Towne filed August 25, 1949, Serial No. 112,399. A silicone polymer is conveniently employed in the form of a concentrate in a hydrocarbon solvent, such as kerosene. For example, a very satisfactory anti-foam agent for this purpose is prepared by diluting 10 grams of a dimethyl silicone polymer (1000 cs. at 25° C.) with kerosene to bring the volume to 100 ccs. A proportion of the order of 0.0–0.05% by weight of the immediately foregoing concentrate is ordinarily employed, preferably sufficient to provide about 50 to 200 parts per million of the silicone polymer concentrate on the basis of the hydraulic fluid.

As a convenient source of a commercial additive combining both the polyvalent metal salt of the P₂S₅-aliphatic alcohol reaction product and the petroleum sulfonate, there is mentioned the additive sold under the trade name of "Aerolube 210" by American Cyanamid Company. This commercial additive contains approximately 42.5% by weight of the barium salt of $P_2S_5$-$C_{10}$ aliphatic alcohol reaction product or barium didecyl dithiophosphate, 12% of sodium mahogany sulfonate and 45.5% of a light distillate mineral lubricating oil forming a concentrate of the ingredients. In the following description, the said additives are specified on an oil-free basis and the mineral oil of any concentrate is figured in with the added paraffin base distillate mineral lubricating oil, except where the contrary appears from the text or the commercial additive is specified by trade name.

By way of preferred example, a typical formula for the hydraulic transmission fluid of the present invention having a viscosity index of at least 150 and a pour point at least as low as −35° F. is represented by the following, wherein the ingredients are specified in percentages by weight:

| | Proportion Range | Preferred Range |
|---|---|---|
| Paraffin Base Distillate Mineral Lubricating Oil | 89–96 | 91–95 |
| Mixture of Methacrylate Ester Copolymers of Specified Formula, where R is a mixture of Alkyl Groups containing from 8 to 20 carbons atoms | 2.0–4.0 | 2.5–3.5 |
| Sulfurized Sperm Oil | 1.0–5.0 | 2.0–4.0 |
| Barium dialkyl dithiophosphate where each alkyl group contains from 8 to 16 carbon atoms | 0.3–1.2 | 0.4–1.0 |
| Sodium Mahogany Sulfonate | 0.05–0.6 | 0.1–0.4 |
| Anti-Foam Agent, such as Dimethyl Silicone Concentrate | 0.0–0.05 | 0.005–0.02 |

When the preferred 2.5 to 3.5 weight per cent concentration of methacrylate ester copolymer mixture in the above table is distributed into 40 to 65 weight per cent pour depressant copolymer and 60 to 35 per cent viscosity index improving copolymer, it is seen that a preferred composition comprises 1.0 to 2.25 per cent pour depressant copolymer and 0.87 to 2.1 weight per cent of the viscosity index improving copolymer.

When prepared from the commercial additives specified above, the formula may be set forth as follows:

Percentage by weight
Paraffin base distillate mineral lubricating oil __ 84–93
"Acryloid 150" _____ 2.5–5.0
"Acryloid 710" _____ 2.0–4.5
Sulfurized sperm oil _____ 2.0–4.0
"Aerolube 210" _____ 0.6–2.5
Silicone polymer concentrate, 50–200 parts per million.

The following preparation of a plant batch of the hydraulic transmission fluid is set forth by way of a preferred example of the present invention. A blend of 526 gallons (42.7% by volume) of a light paraffin base distillate mineral lubricating oil having an SUS viscosity at 100° F. of about 70 and hereinafter termed "70 grade oil," was made with 707 gallons (57.3% by volume) of a similar paraffin base distillate mineral lubricating oil having an SUS viscosity at 100° F. of about 100 and hereinafter designated as "100 grade oil." Typical tests on the two oils were as follows:

| Tests | 70 Grade Oil | 100 Grade Oil |
|---|---|---|
| Gravity, °API | 30.5 | 29.3 |
| Flash O-Cleve., °F | 355 | 380 |
| Fire, Cleve., °F | 395 | 420 |
| Viscosity Say. Univ. at 100° F | 70.1 | 101.5 |
| Viscosity Say. Univ. at 210° F | 36.3 | 38.9 |
| Viscosity Index | 86 | 67 |
| Pour, °F | 15 | 20 |
| Color 6 in. Lovi | 15 | 30 |

The resulting base oil blend had an SUS viscosity at 100° F. of about 86, a viscosity index of about 76 and a pour point of about 20° F. Ordinarily the base oil or base oil blend selected will have an SUS viscosity at 100° F. of about 75–95, a viscosity index of about 75–90 and a pour point of about 15–25° F.

Utilizing the foregoing base oil, the following compounded hydraulic fluid was prepared:

| Ingredients | Weight in Pounds | Percent By Weight |
|---|---|---|
| Base Oil | 9,007 | 88.835 |
| "Acryloid 150" | 406 | 4.0 |
| "Acryloid 710" | 330 | 3.25 |
| Sulfurized Sperm Oil | 304 | 3.0 |
| "Aerolube 210" | 91.4 | 0.9 |
| Anti-foam concentrate (kerosene solution of dimethyl silicone polymer having kinematic viscosity at 25° C. of 1000 cs. prepared in the proportion of 10 grams of the polymer diluted with kerosene to 100 ccs.) | 1.52 | 0.015 |

Typical tests on the additives employed in the foregoing formulation are:

Acryloid 150 (Appearance—Clear light amber-colored viscous fluid):
  Specific gravity, 60°/60° F _____ 0.89–0.90
  Viscosity, kinematic at 210° F. cs _____ 600–800
  Viscosity, kinematic at 100° F. cs _____ 5,800
R radical comprises about 50 per cent cetyl, 25 per cent lauryl and about 25 per cent octyl groups.

Acryloid 710 (Appearance—Clear amber-colored viscous fluid):
  Viscosity, SUS at 210° F _____ 3250–3720
  Viscosity, kinematic at 100° F. cs _____ 7,570
R radical comprises about 50 per cent lauryl and 50 per cent octyl groups.

Sulfurized sperm oil:
  Gravity, ° API _____ 14.5–16.0
  Viscosity, SUS at 210° F _____ 190–230
  Sulfur, percent by weight _____ 9–11
  Saponification No _____ 140–155

Aerolube 210 (Appearance—Dark oily liquid):
  Specific gravity, 60°/60° F _____ 1.016
  Barium, per cent by weight _____ 6.0–7.3
  Phosphorus, per cent by weight _____ 2.6–3.2
  Sulfur, per cent by weight _____ 6.0–7.0
  Sodium, per cent by weight _____ 0.25–0.40

In compounding the plant batch, the 100 grade and 70 grade oils were pumped into a 3,000 gallon capacity kettle equipped with a steam jacket for heating and an air spider for agitation. The mixed oils were then agitated by the injection of air, and steam was turned into the jacket to raise the temperature to about 180° F. The steam was cut off and, during vigorous agitation the additives were added successively in the following order over a period of approximately 1½ hours: Acryloid 710, Acryloid 150, sulfurized sperm oil, Aerolube 210 and finally the anti-foam concentrate. During this period the temperature had dropped to approximately 175° F. Agitation was then stopped, the batch allowed to cool, and the finished hydraulic fluid filled into drums or cans.

Tests obtained on the foregoing compounded hydraulic transmission fluid were as follows:

Gravity, ° API _____ 28.8
Flash O-Cleve., ° F _____ 375
Fire Cleve., ° F _____ 420
Viscosity, SUS at 100° F _____ 209.3
Viscosity, SUS at 130° F _____ 121.8
Viscosity, SUS at 210° F _____ 55.93
Viscosity index _____ 153.5
Pour point, ° F _____ −35
Carbon residue, per cent _____ 0.18
Neut. No _____ 0.03
Sap. No _____ 6.4

Sulfur, per cent by weight_____ 0.45
Phosphorus, per cent by weight_____ 0.024
Barium, per cent by weight_____ 0.065
Sulfated residue, per cent by weight_____ 0.14

It will be appreciated that the foregoing preferred blend is designed for passenger car automatic transmissions in order to meet a specification requirement of 54–56 SUS viscosity at 210° F. Where different viscosity requirements are imposed, such as for torque converters in the industrial, bus and truck fields, a different cut of the refined paraffin base distillate mineral lubricating oil will of course be selected, so that the compounded hydraulic fluid with its additive content will meet the different viscosity requirements. While the matter of meeting the viscosity requirements is of course straight-forward and conventional, when that is combined with requirements for high viscosity index of 150 and above and with the extremely low pour point of −35° F. maximum, a different problem is presented which departs substantially from conventional practice. This is illustrated by the following data which was obtained on a paraffin base wax distillate initially having the following tests:

Gravity, ° API_____ 30.4
Flash COC, ° F_____ 380
Fire Cleve., ° F_____ 420
Vis., SUS at 100° F_____ 86.5
Vis., SUS at 210° F_____ 37.9
Vis. index_____ 82.2
Color Lovi_____ 55/½ inch
Pour, ° F_____ 65
Neut. No_____ 0.10
Carbon residue_____ 0.03

This wax distillate was furfural refined with a 150% solvent dosage to about an 85% yield, and then separate portions of the furfural refined stock were solvent dewaxed with methyl ethyl ketone and benzol to different pour points, namely one portion of the stock to −5° F. pour and another portion of the stock to +10° F. pour. Tests obtained on the two dewaxed portions were as follows:

| Tests | Dewaxed to −5° F. Pour | Dewaxed to +10° F. Pour |
|---|---|---|
| Flash COC, ° F | | 365 |
| Vis., SUS at 100° F | 79.3 | 76.9 |
| Vis., SUS at 210° F | 37.2 | 37.0 |
| Viscosity Index | 82.0 | 83.8 |
| Pour, ° F | −5 | +10 |

The two base oils dewaxed to different pours were then blended with the above-described additives in the optimum proportions, and tests obtained on the resulting compounded oils as follows:

| Composite Weight, percent | Using −5° F. Pour Base Oil | Using +10° F. Pour Base Oil |
|---|---|---|
| Base Oil | 88.835 | 88.835 |
| "Acryloid 150" | 4.0 | 4.0 |
| "Acryloid 710" | 3.25 | 3.25 |
| Sulfurized Sperm Oil | 3.0 | 3.0 |
| "Aerolube 210" | 0.9 | 0.9 |
| Dimethyl Silicone Polymer Concentrate | 0.015 | 0.015 |

| Tests | Using −5° F. Pour Base Oil | Using +10° F. Pour Base Oil |
|---|---|---|
| Flash COC, ° F | 395 | 395 |
| Vis., SUS at 100° F | 181.5 | 171.8 |
| Vis., SUS at 210° F | 52.9 | 52.0 |
| Vis. Index | 156 | 158 |
| Pour, ° F | −25 | −35 |

The foregoing tests show that the conventional dewaxed base oil having a pour of −5° F. proved unsuitable in the hydraulic fluid composition in meeting the required low pour in addition to the high viscosity index. On the other hand, the +10° F. pour base oil was border line in this respect and represented approximately the lower limit of pour point for the base oil in order to meet the rigorous requirements.

One of the requirements for a hydraulic transmission fluid of this character is that it should pass the CRC L–4 Oxidation test at 265° F. crankcase temperature, when the fluid is diluted with an equal or greater volume of a refined uninhibited lubricating oil. Passing this test requires a Cu-Pb bearing weight loss below a specified maximum and a satisfactory CRC rating and piston rating with respect to deposits or engine cleanliness. The composition set forth above for the plant batch readily passes this test with the said composition diluted with an equal volume of refined uninhibited mineral lubricating oil. Where increased resistance to oxidation at greater dilution ratios in this test is desired, the proportions of the polyvalent metal salt of the $P_2S_5$-aliphatic alcohol reaction product and of the petroleum sulfonate are increased toward the upper portions of their respective specified ranges. The following is an example of a hydraulic transmission fluid which has been prepared to satisfactorily pass the said test at dilution ratios of 3:1 to 4:1—

Percent by weight
Paraffin base distillate mineral lubricating oil___ 87.735
"Acryloid 150"_____ 4.000
"Acryloid 710"_____ 3.250
Sulfurized sperm oil_____ 3.000
"Aerolube 210"_____ 2.000
Dimethyl silicone polymer concentrate_____ 0.015

The features of employing a comparatively light paraffin base distillate mineral lubricating oil containing sufficient residual wax to have a pour point between 10 and 30° F., in conjunction with the two different types of methacrylate ester co-polymers, and this in conjunction with the other additives which must be miscible and stable therewith, in order to produce the new type of hydraulic transmission fluid, represent a definite departure from the prior practice in this art. It is noted that, in conjunction with the residual wax-containing oil, substantial quantities of both the viscosity index improving methacrylate ester copolymer and the pour point depressant methacrylate ester copolymer are required. Ordinarily, the viscosity index improving polymer will run about 35–60% by weight of the polymer mix, with the pour point depressant methacrylate polymer amounting to about 65–40% by weight based on said mixture. By selecting a paraffin base distillate mineral lubricating oil having an SUS viscosity at 100° F. of about 70–100, a viscosity index of about 75–90 and a pour point of about 10–30° F., the specified additives employed in the proportions stated will produce a finished compounded hydraulic transmission fluid having an SUS viscosity at 210° F. of about 50–60, a viscosity index of at least 150 and a pour point at least as low as −35° F.

As pointed out above, the requirements with respect to viscosity index and pour point are not met by initially selecting a dewaxed lubricating oil of motor oil grade having a pour point in conventional practice of about −10 to +5° F., generally about 0° F. However, it is also possible to meet the requirements of the specification by selecting a light paraffin base distillate mineral lubricating oil which has been very highly dewaxed to the extremely low pour of about −15 to −30° F. or lower. For example, utilizing a paraffin base distillate motor oil of SAE 5 Winter Grade having a pour point of −20° F., and employing sulfurized ethyl oleate in place of the sulfurized sperm oil, the following formulation met the requirements:

| | | |
|---|---|---|
| SAE 5 base oil | per cent by weight | 89.85 |
| "Acryloid 150" | do | 0.25 |
| "Acryloid 710" | do | 6.00 |
| Sulfurized ethyl oleate | do | 3.00 |
| "Aerolube 210" | do | 0.90 |
| Dimethyl silicone polymer concentrate | parts per million | 150 |

The foregoing formulation had a viscosity index of 153 and pour point of −50° F. However, it will be appreciated that this requires more expensive dewaxing to the lower pour point base oil. With this lower pour point base oil, the proportion of the pour depressant methacrylate ester copolymer can be decreased while the proportion of the viscosity index improving methacrylate ester copolymer is increased, maintaining the overall amount of the polymer mixture within the limits previously mentioned although generally toward the lower end of that range. In this case, the pour depressant copolymer generally runs about 3–30% and the viscosity index improving copolymer about 97–70% by weight of the copolymer mixture.

Obviously, many other modifications and variations of the invention as hereinbefore set forth may be made without departing from the spirit and scope thereof, and therefore, only such limitations should be imposed as are indicated in the appended claims.

We claim:

1. A hydraulic transmission fluid adapted for automatic transmissions and characterized by an SUS viscosity at 210° F. of 50 to 60, a viscosity index of at least 150 and a pour point at least as low as −35° F. consisting of the following ingredients in percentages by weight:

| | |
|---|---|
| Paraffin base distillate mineral lubricating oil having an SUS viscosity at 100° F. of 70 to 100, a viscosity index of 70 to 95, a residual wax content sufficient to yield a pour point of 15 to 25° F | 91 to 95 |
| Methacrylate ester copolymer having a molecular weight of 10,000 to 20,000 and of the general formula 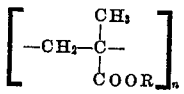 wherein R is predominantly a mixture of 40 to 60 per cent lauryl and 60 to 40 per cent octyl groups | 0.87 to 2.1 |
| Methacrylate ester copolymer of same general formula and molecular weight range wherein R is predominantly a mixture of 30 to 70 per cent cetyl, 45 to 10 per cent lauryl and 45 to 10 per cent octyl groups | 1.0 to 2.25 |
| Sulfurized sperm oil | 2.0 to 4.0 |
| Barium didecyl dithiophosphate | 0.4 to 1.0 |
| Sodium mahogany sulfonate | 0.1 to 0.4 |
| Silicone polymer concentrate p. p. m | 50 to 200 |

2. A hydraulic fluid having as the essential ingredient, constituting at least 85 per cent by weight of the fluid, a paraffin base distillate mineral lubricating oil having an SUS viscosity at 100° F. below 100 and above 70, a V. I. below 100 and above 65 and containing sufficient residual wax to have a pour point of at least 10° F., but below 30° F., about 1 to 6 per cent by weight of a mixture of methacrylate ester copolymers of the general formula

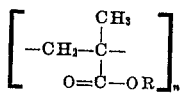

wherein R is an alkyl group containing 4 to 20 carbon atoms and n is a number providing a molecular weight of 10,000 to 20,000, 40 to 65 per cent of said copolymer mixture being a methacrylate ester copolymer having predominantly pour depressant properties, in which R comprises 30 to 70 per cent of alkyl groups having 15 to 20 carbon atoms and 70 to 30 per cent of alkyl groups having 4 to 14 carbon atoms, and 60 to 35 per cent of said copolymer mixture being a methacrylate ester copolymer having predominantly V. I.-improving properties in which R is a mixture of C4 to C14 alkyl groups, said resulting hydraulic fluid having a V. I. of at least 150 and a pour point at least as low as −35° F.

3. A hydraulic fluid according to claim 2 in which the R group in said pour depressant methacrylate copolymer comprises 30 to 70 per cent cetyl, 45 to 10 per cent lauryl, and 45 to 10 per cent octyl groups and the R groups in said V. I.-improving copolymer comprises 40 to 60 per cent lauryl and 60 to 40 per cent octyl groups.

4. A hydraulic fluid according to claim 2, and particularly adapted for automatic transmissions and also containing 1–5 per cent by weight of a sulfurized fatty material selected from the group consisting of fatty oils and fatty acid esters of monohydric alcohols and containing from 5 to 15 per cent by weight, based on the fatty material, of stably combined sulfur and possessing extreme pressure and oiliness properties, about 0.1–2 per cent of an anti-oxidant and anti-corrosive polyvalent metal salt of a P2S5-aliphatic alcohol reaction product wherein the aliphatic alcohol contains from 5 to 20 carbon atoms, and about 0.05–1.0 per cent of a petroleum sulfonate.

5. A hydraulic fluid according to claim 2 in which said pour depressant methacrylate ester copolymer constitutes 1.0 to 2.25 weight per cent of the total liquid and said V. I.-improving methacrylate ester copolymer constitutes 0.87 to 2.1 weight per cent of the total liquid.

6. A hydraulic fluid adapted for automatic transmissions and having as the essential ingredient, constituting at least 85 per cent by weight of the fluid, a paraffin base distillate mineral lubricating oil having an SUS viscosity at 100° F. below 100 and above 70, a V. I. below 100 and above 65 and containing sufficient residual wax to have a pour point of at least 10° F. but below 30° F., about 1 to 6 per cent by weight of a mixture of methacrylate ester copolymers of the general formula

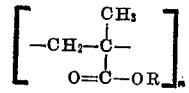

wherein R is an alkyl group containing 4 to 20 carbon atoms and n is a number providing a molecular weight of 10,000 to 20,000, 40 to 65 per cent of said copolymer mixture being a methacrylate ester copolymer having predominantly pour depressant properties in which R comprises 30 to 70 per cent alkyl groups having 15 to 20 carbon atoms and 70 to 30 per cent alkyl groups having 4 to 14 carbon atoms, 60 to 35 per cent of said copolymer mixture being a methacrylate ester copolymer having predominantly V. I.-improving properties in which R is a mixture of C4 to C14 alkyl groups, about 1–5 per cent by weight of a sulfurized fatty material selected from the group consisting of fatty oils and fatty acid esters of monohydric alcohols and containing from 5 to 15 per cent by weight, based on the fatty material, of stably combined sulfur and possessing extreme pressure and oiliness properties, about 0.1–2 per cent of an anti-oxidant and anti-corrosive polyvalent metal salt of a P2S5-aliphatic alcohol reaction product wherein the aliphatic alcohol contains from 5 to 20 carbon atoms, about 0.05–1.0 per cent of a petroleum sulfonate and a small amount of an anti-foam agent, said resulting hydraulic fluid having a V. I. of at least 150 and a pour point at least as low as −35.

7. A hydraulic transmission fluid according to claim 6 in which the R group in said pour depressant methacrylate copolymer comprises 30 to 70 per cent cetyl, 45 to 10 per cent lauryl, and 45 to 10 per cent octyl groups and the R groups in said V. I.-improving copolymer comprises 40 to 60 per cent lauryl and 60 to 40 per cent octyl groups.

8. A hydraulic transmission fluid according to claim 6 in which said pour depressant methacrylate ester copolymer constitutes 1.0 to 2.25 weight per cent of the total liquid and said V. I.-improving methacrylate ester copolymer constitutes 0.87 to 2.1 weight per cent of the total liquid.

References Cited in the file of this patent

UNITED STATES PATENTS

| | | |
|---|---|---|
| 1,898,564 | Muench et al. | Feb. 21, 1933 |
| 2,091,627 | Bruson | Aug. 31, 1937 |
| 2,179,060 | Smith | Nov. 7, 1939 |
| 2,407,954 | Fenske et al. | Sept. 17, 1946 |
| 2,504,552 | Lewis | Apr. 18, 1950 |
| 2,549,270 | Watson | Apr. 17, 1951 |
| 2,604,453 | Popkin | July 22, 1952 |

OTHER REFERENCES

Knight: "The Silicones—Truly New Materials", in Materials and Methods (formerly Metal and Alloys) October 1945, pps. 1069–1073.